Nov. 23, 1971  V. KUPCIKEVICIUS  3,621,513
METHOD AND APPARATUS FOR AUTOMATIC STUFFING MACHINES
Filed May 22, 1969  2 Sheets-Sheet 1
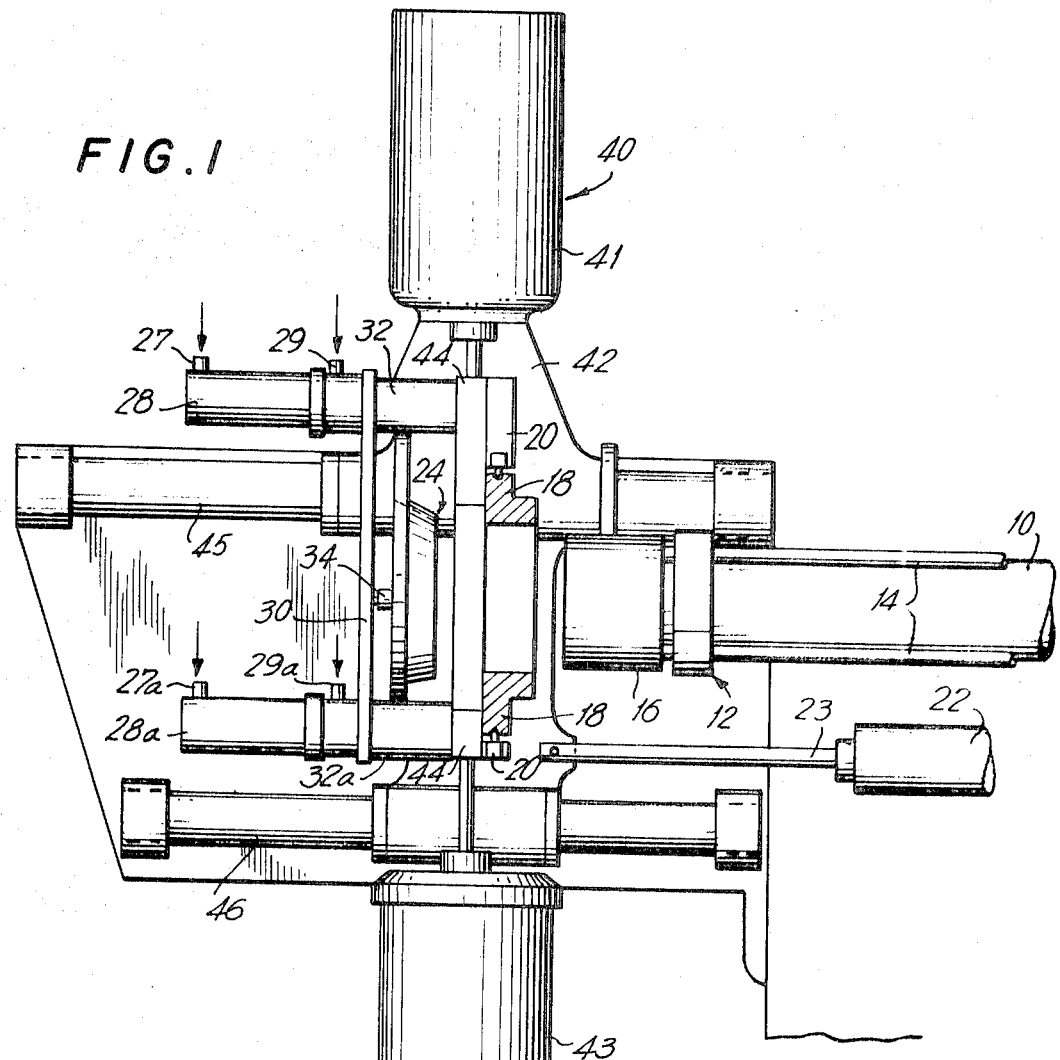
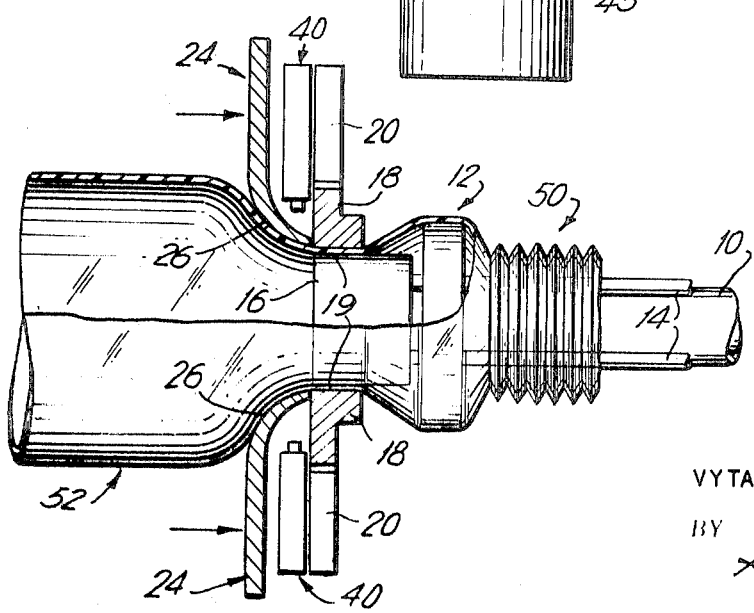
INVENTOR.
VYTAUTAS KUPCIKEVICIUS
BY
ATTORNEY

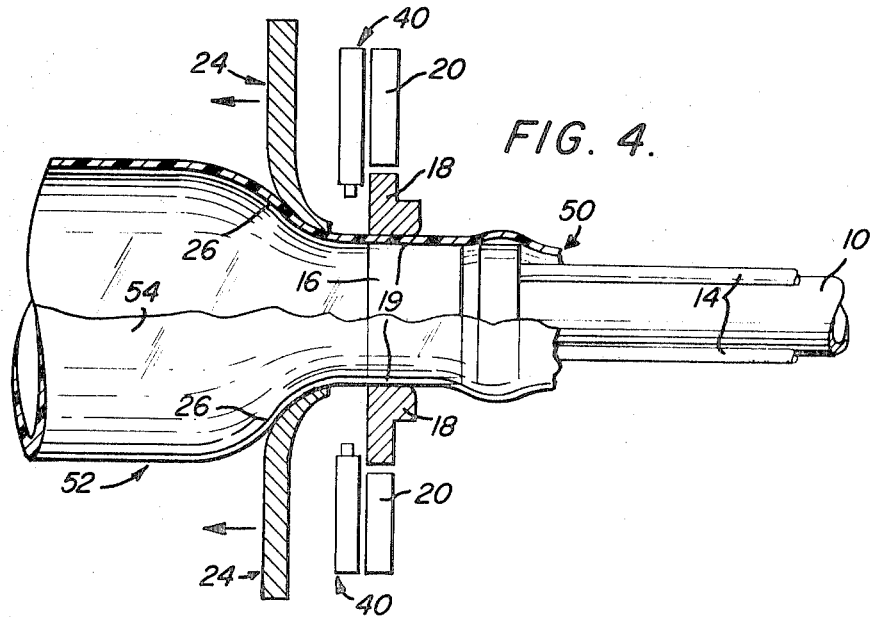
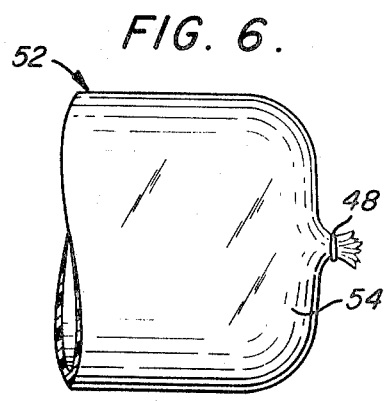
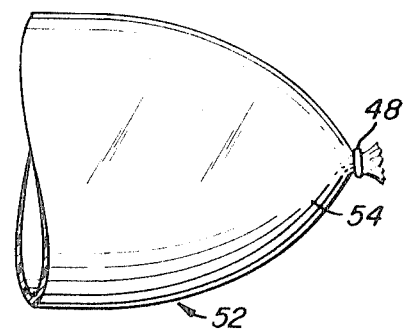
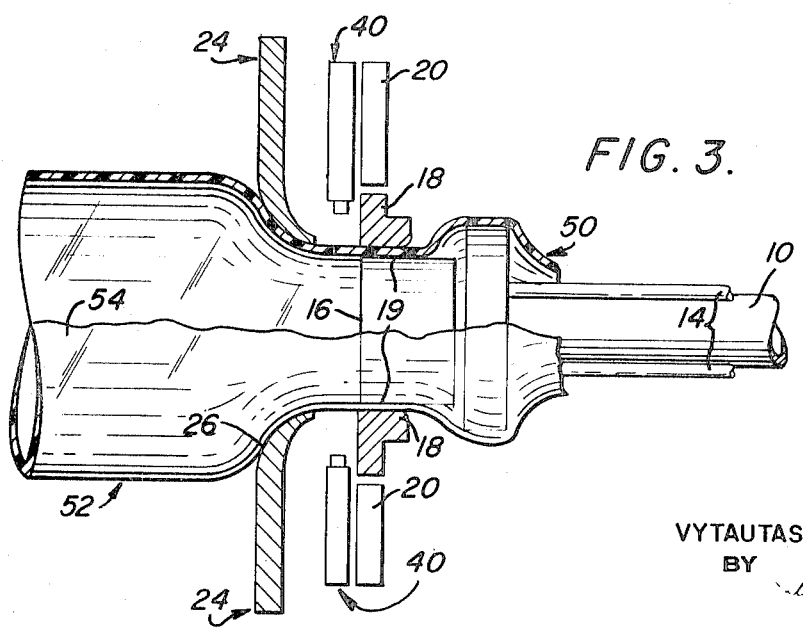

United States Patent Office 3,621,513
Patented Nov. 23, 1971

3,621,513
METHOD AND APPARATUS FOR AUTOMATIC STUFFING MACHINES
Vytautas Kupcikevicius, Chicago, Ill., assignor to Union Carbide Corporation, New York, N.Y.
Filed May 22, 1969, Ser. No. 826,951
Int. Cl. A22c 13/00
U.S. Cl. 17—41     13 Claims

ABSTRACT OF THE DISCLOSURE

A method and apparatus are provided for constricting and compacting the last filled end of a sausage casing after it has been stuffed with a food emulsion, thereby facilitating the application of a clip to close its last filled end. There is also provided a method and apparatus for preventing food emulsion flow back during the stuffing of, and after, a sausage casing has been stuffed with a food emulsion.

---

This invention relates to a method and apparatus for facilitating the application of a clip to close the last filled end of a stuffed sausage casing. This invention also relates to a method and apparatus for preventing food emulsion flow back during the stuffing of, and after, a sausage casing has been stuffed with a food emulsion.

The term "sausage casing," as used throughout this specification and in the appended claims, is intended to refer to and should be understood as referring to those food casings manufactured from such materials as regenerated cellulose, cellulose, and cellulose having fibrous webs embedded therein and which are employed to produce sausage products such as salami and bologna sausages, spiced meat loafs, cooked and smoked ham butts and the like. These sausage casings are produced in flat width of from about 2" to 15" and can range in length from about 14" to 72" and longer.

The method and apparatus of this invention can be adapted for use with any commercial stuffing apparatus but is particularly well suited for use with the automatic stuffing apparatus disclosed and described in copending application Ser. No. 599,271 filed Dec. 5, 1966 now U.S. Pat. 3,457,588 issued July 29, 1969. In this copending application there is provided a tubular collar mounted at the discharge end of a stuffing tube and an emulsion stoppering ring separately mounted in a spaced-apart oblique relationship with respect to the tubular collar. Mounted on the stuffing tube adjacent to the tubular collar, there is also provided a pre-sizing means which serves to uniformly expand a sausage casing internally to a predetermined peripheral dimension before the sausage casing is stuffed with a food emulsion. The tubular collar is fabricated to have an outside diameter less than the inside diameter of a sausage casing to be stuffed while the emulsion stoppering ring is fabricated to have an inside diameter less than the outside diameter of a stuffed sausage casing.

In operation, the emulsion stoppering ring of the apparatus in the copending application identified above is indexed obliquely adjacent the tubular collar to provide a serpentine path through which the wall of the food casing passes as it is being stuffed with a food emulsion. When the flow of food emulsion is stopped, it creates a back pressure against that portion of the stuffed sausage casing adjacent the emulsion stoppering ring. This back pressure forces the emulsion stoppering ring to move axially against the tubular collar and serves to clamp the wall of the sausage casing between it and the tubular collar thereby preventing food emulsion stuffed in the sausage casing from flowing back over the outer surface of the stuffing tube. While this apparatus functions efficiently, it requires that the emulsion stoppering ring be positioned during operation within narrow space tolerances with respect to the tubular collar. For example, it was found that if the emulsion stoppering ring were spaced too far from the tubular collar, it would not function to prevent food emulsion flow back. On the other hand, when the emulsion stoppering ring was positioned too close to the tubular collar, the wall of a sausage casing was subjected to friction as it passed between these components during stuffing thereby adversely affecting the function of the pre-sizer means of the apparatus.

Another problem encountered in the apparatus of copending application Ser. No. 599,271 identified above, resulted from the use of the commercial metal clip application unit employed to attach a clip and thereby close the last filled end of a stuffed sausage casing. In operation, the scissor-like casing gathering elements of the clip unit first neck down, then constrict and gather the wall of the casing to displace the meat emulsion from the stuffed diameter of the sausage casing to a substantially smaller diameter at which time a metal clip is automatically affixed to close the last stuffed end of the sausage casing. The abrasion and severe pressure strains imposed on the wall of a sausage casing from this gathering and constricting action of the clip unit often resulted in breakage of the wall of a stuffed sausage casing at its last stuffed end either before, during or after the stuffed sausage casing was subjected to further processing.

It is an object of this invention to provide a method and apparatus for preventing food emulsion flow back during the stuffing of and after a sausage casing has been stuffed with a food emulsion which method and apparatus do not require closely controlled space tolerances between the cooperating components of the apparatus.

Another object is to provide a method and apparatus for constricting and reducing the diameter at the last stuffed end of a stuffed sausage casing so that it can be closed by affixing a clip thereat with a minimum of strain to the wall of the stuffed sausage casing and without damaging or breaking the stuffed sausage casing.

These and other objects of the invention will become apparent from the ensuing description.

The objects of the invention can be generally attained by providing a method and apparatus comprising means for defining and forming a closely spaced annular passage at the discharge end of a stuffing tube through which closely spaced passage the wall of a sausage casing is caused to pass as it is being stuffed with a food emulsion; and, means for pushing a necked down portion of the last filled end of a stuffed sausage casing away from the end of the stuffing tube while it is being restrained to gently constrict the last filled end of the stuffed sausage casing to a diameter smaller than that of the stuffed sausage casing before a clip is affixed thereat to close the last filled end of the stuffed sausage casing.

In one embodiment, the apparatus of the invention comprises, in combination, a cylindrical stoppering sleeve mounted at the discharge end of a stuffing tube; an emulsion stoppering ring fabricated so that, when it is in its operating position relative to the cylindrical stoppering sleeve, there is formed and defined therebetween a closely spaced annular passage; means for advancing and retracting the emulsion stoppering ring into and out of operating position; a dished platen having an extended, tapered annulus positioned adjacent the discharge end of a stuffing tube; means to advance and retract the dished platen toward and away from the discharge end of the stuffing tube; a clip unit positioned intermediate the discharge end of the stuffing tube and the dished platen; and, means to actuate the clip unit.

The invention will become more clear when considered together with the accompanying drawing wherein:

FIG. 1 is a side elevational view, part in section, illustrating the apparatus of the invention;

FIGS. 2–4 are side elevational views, part in section, illustrating the various components of the apparatus of the invention in their sequential operating positions; and, FIGS. 5 and 6 are side elevational views schematically illustrating a portion of a stuffed sausage casing which can be obtained by use of the apparatus of the invention.

Turning now to the drawing, there is shown in FIGS. 1 and 2 a stuffing tube 10 having an inlet end and a discharge end, the inlet being connected to a supply source of food emulsion (not shown). A cylindrical stoppering sleeve 16 is mounted at the discharge end of stuffing tube 10 and a pre-sizing means, generally denoted by reference numeral 12, equipped with connecting shafts 14 is shown mounted to the stuffing tube 10 aft of the cylindrical stoppering sleeve 16. The stuffing tube 10 and pre-sizing means 12 with its connecting shafts 14 can be the same as or similar to these components as disclosed and described in copending application Ser. No. 599,271, identified hereinabove.

It will be noted, that the cylindrical stoppering sleeve 16 illustrated in the accompanying drawing is of a different configuration than its corresponding component illustrated and disclosed in the above-identified copending application. In the above-identified copending application, the tubular collar is fabricated to be a "donut" shape whereas the cylindrical stoppering sleeve 16 of this invention is fabricated to be of a tubular shape and of a diameter so that it is concentric to the stuffing tube 10. Cylindrical stoppering sleeve 16 is fabricated to be of a length of at least about equal to its diameter. Hence, if the diameter of the stuffing tube 10 is 3″, the length of the cylindrical stoppering sleeve 16 will also be at least about 3″.

Separately mounted and positioned in a spaced-apart relationship to cylindrical stoppering sleeve 16 is an emulsion stoppering ring 18 which is movably secured to a support bracket 20 so that it is capable of some slight annular displacement. Emulsion stoppering ring 18 is fabricated so that its inside diameter is from about $\frac{1}{32}″$ to $\frac{1}{16}″$ larger than the outside diameter of cylindrical stoppering sleeve 16, and its length is no less than about $\frac{1}{3}$ that of the cylindrical stoppering sleeve 16. Therefore, if the length of the cylindrical stoppering sleeve is about 3″, the length of the emulsion stoppering ring 18 will be about 1″. When emulsion stoppering ring 18 is indexed to its operating position adjacent to and about cylindrical stoppering sleeve 16 (FIGS. 2–4), a closely spaced annular passage 19 is defined and formed between the outer circumference of cylindrical stoppering sleeve 16 and the inner circumference of emulsion stoppering ring 18. Consequently, the closely spaced annular passage 19 will also have an annular spacing of from about $\frac{1}{32}″$ to $\frac{1}{16}″$ between cylindrical stoppering sleeve 16 and emulsion stoppering ring 18. Preferably, the emulsion stoppering ring 18 is fabricated so that when it is indexed in its operating position with respect to cylindrical stoppering sleeve 16, the spacing of the closely spaced annular passage 19 will be no less than about three times greater than the single wall thickness of a sausage casing to be stuffed and no greater than about ten times the single wall thickness of a casing to be stuffed. Hence, if the single wall thickness of a sausage casing to be stuffed is about 0.005 inch, the spacing of the closely spaced annular passage 19 should be from about 0.015 inch to 0.050 inch.

Reference numeral 22 denotes a pneumatic cylinder whose piston rod 23 is attached to support bracket 20. Pneumatic cylinder 22 together with its piston rod 23 and the support bracket 20 provide the means by which emulsion stoppering ring 18 is advanced to be indexed to its operating position relative to cylindrical stoppering sleeve 16 and then retracted out of its operating position.

A dished platen, generally identified by reference numeral 24, having an extended tapered annulus 26 (FIGS. 2–4) is secured at its upper and lower ends to the piston rods of pneumatic cylinders 28, 28a, respectively, so that the dished platen 24 is maintained on its vertical axis between pneumatic cylinders 28, 28a. Pneumatic cylinders 28, 28a are mounted to a vertically disposed face plate 30 and provide the means by which dished platen 24 is advanced and retracted during operation. The diameter at the opening of the extended annulus 26 of dished platen 24 should be fabricated to be no smaller than the inside diameter of the emulsion stoppering ring 18.

Reference numerals 32, 32a denote mounting blocks for face plate 30, while reference numerals 27, 27a denote blind end ports for pneumatic cylinders 28, 28a, respectively, and reference numerals 29, 29a denote rod end ports for pneumatic cylinders 28, 28a, respectively. Blind end ports 27, 27a and rod end ports 29, 29a are connected in parallel, by means of conventional conduits, to a supply source of compressed air equipped with a pneumatic control valve (not shown). Blind end ports 27, 27a and rod end ports 29, 29a are respectively controlled to operate in unison.

One or more stop pins 34 are secured to the face plate 30 so that they extend toward the dished platen 34. Stop pins 34 are provided to halt or limit the travel of dished platen 24 away from emulsion stoppering ring 18. The length of stop pins 34 and/or the position of face plate 30 can be adjusted to limit the travel of dished platen 24 as desired or required.

A commercial clip unit, such as Tipper Clipper, is generally identified by reference numeral 40 and is positioned to operate intermediate the emulsion stoppering ring 18 and dished platen 24. Clip unit 40 generally comprises an upper and lower pneumatic cylinder 41, 43, respectively, a clip unit carriage 42 and a slide block 44. Support bracket 20 is an extension and integral part of unit carriage 42 so that when pneumatic cylinder 22 is activated to advance the retract stoppering ring 18, clip unit 40 is also advanced and retracted by means of clip unit 42. Clip unit carriage 42 is slideably mounted on a pair of shafts 45, 46.

In FIGS. 2–4, a sausage casing is generally identified by reference numeral 50, while in FIGS. 2–6, reference numeral 52 generally denotes a stuffed sausage and reference numeral 54 identifies its last filled end.

In FIGS. 5 and 6, reference numeral 48 denotes the clip applied to close the last filled end 54 of a stuffed sausage 52.

A typical operation of the apparatus of the invention will now be described and will be more readily comprehended when considered together with the accompanying drawing.

Prior to start up, the emulsion stoppering ring 18, dished platen 24 and clip unit 40 are in their respective positions relative to each other, the cylindrical stoppering sleeve 16 and the stuffing tube 10 as shown in FIG. 1. A sausage casing 50 having a pre-closed end (not shown) is sheathed from its open end, over and about cylindrical stoppering sleeve 16 and the pre-sizing means 12, and is extended along the stuffing tube 10 until its pre-closed end is drawn taught adjacent the cylindrical stoppering sleeve 16 at the discharge end of the stuffing tube 10.

Pneumatic cylinder 22 (FIG. 1) is now activated to retract its piston rod 23 and thereby advance and index emulsion stoppering ring 18 to its operating position adjacent to and concentrically about cylindrical stoppering sleeve 16 and, at the same time, advance clip unit 40 to its operating position adjacent the discharge end of stuffing tube 10 (FIG. 2). Emulsion stoppering ring 18 can be indexed at any point along the length of cylindrical stoppering sleeve 16 provided the inner circumferential wall of emulsion stoppering ring 18 is concentric to a portion of the outer circumferential wall of cylindrical stoppering sleeve 16. Since emulsion stoppering ring 18 is fabricated so that a predetermined, closely spaced annular passage 19 is defined between it and cylindrical stoppering sleeve 16, precise axial adjustment is not necessary when it is indexed to its operating position to have it function properly as a stoppering means to prevent flow back of the food emulsion over the stuffing tube 10.

Immediately after emulsion stoppering ring 18 and clip unit 40 have been thusly advanced and indexed, the pre-sizing means 12 are activated to be expanded in the same manner as disclosed and described in the above-identified copending application to internally expand the wall of the sausage casing 50 to a predetermined size and to restrain its advance as it is being stuffed (FIG. 2).

Blind end ports 27, 27a of pneumatic cylinders 28, 28a are then simultaneously pressurized to advance dished platen 24 until its tapered, extended annulus 26 is in contact with emulsion stoppering ring 18 (FIG. 2). Advance of the dished platen 24 can be controlled to occur at the same time as or immediately after emulsion stoppering ring 18 and clip unit 40 are advanced and indexed.

A food emulsion, which is generally of a viscous nature, is now admitted under pressure through stuffing tube 10 to stuff the sausage casing 50. During stuffing of the sausage casing 50, the components of the apparatus are in their respective positions as illustrated in FIG. 2. The defined closely spaced annular passage 19 provides sufficient clearance for the wall of the sausage casing 50 to pass freely therethrough during stuffing. The sausage casing 50 is moved through the annular passage 19 by the forces exerted on the food emulsion from the internal pressure in the stuffed portion of the sausage casing 50. At the same time, the sausage casing 50 is restrained in its movement by the expanded casing presizing means 12. This results in creating a friction seal between the wall of the moving casing and the closely spaced walls defining the annular passage 19, and thereby prevents the viscous food emulsion from flowing back over the outside of the stuffing tube 10 as the sausage casing 50 is being stuffed.

When the sausage casing 50 has been stuffed to its required or desired length to obtain a stuffed sausage 52, the flow of food emulsion is stopped. When this occurs, the food emulsion at the last filled end 54 of the stuffed sausage 52 has a tendency to flow back over the stuffing tube 10 as a result of the pressures exerted in the stuffed sausage 52. This flow back is substantially stopped by means of the small clearance between the casing wall and the closely spaced walls defining the annular passage 19 as well as the viscous nature of the food emulsion.

Simultaneously with or immediately upon stopping the flow of food emulsion, the rod end ports 29, 29a of pneumatic cylinders 28, 28a (FIG. 1) are simultaneously pressurized to advance dished platen 24 toward the last filled end 54 of the stuffed sausage 52 and away from the stuffing tube 10 (FIG. 3). As the dished platen 24 is being thusly advanced, the tapered, extended annulus 26 engages the last filled end 54 of the stuffed sausage 52 and pushes it away from the stuffing tube 10. Meanwhile, the elements of the pre-sizing means 12 are maintained in their expanded position and serve to restrain the advance of the unstuffed portion of the sausage casing 50 (FIG. 3). As a result that portion of the stuffed sausage 52 situate between the extended annulus 26 and the stuffing tube 10 is gently elongated, compacted and constricted to a substantially smaller diameter than that of the stuffed sausage 52 (FIG. 3).

Next, upper and lower cylinders 41, 43 of clip unit 40 are actuated to close the last filled end 54 of the stuffed sausage 52 with a clip 48 (FIGS. 4–6). The thusly closed and stuffed sausage 52 is advanced away from the apparatus and the pre-sizing means 12, emulsion stoppering ring 18, clip unit 40 and dished platen 24 are returned to their non-operative, starting positions before beginning the next stuffing operation.

It has been found that the tautness and shape of the last filled end of the stuffed sausage can be regulated in a predetermined manner by concurrently controlling the time at which the flow of food emulsion is stopped; controlling the advance of the dished platen to elongate, compact and constrict the stuffed sausage; controlling the time of release of the pre-sizing means restraining the unstuffed portion of the casing; and, controlling the time at which a clip is applied to close the stuffed sausage. Consequently, the sequential operation of these elements can be arranged in different order and timing to obtain a stuffed sausage having a slack, elongated rounded end portion as illustrated in FIG. 5, or to obtain a stuffed sausage whose last closed end is taut and whose rounded end portion has been significantly reduced and minimized, as shown in FIG. 6.

For example, to obtain a slack filled sausage casing, such as is illustrated in FIG. 5, the flow of food emulsion would first be stopped and the expanded pre-sizing means would be contracted to loosen and ease the restraining force on the unstuffed portion of the casing. Next, the dished platen 24 would be advanced away from the end of the stuffing tube 10, thereby stripping the casing from the stuffing tube 10 and permitting some of the food emulsion in the stuffed portion of the casing to flow back toward and into the gently elongated portion of the casing situate between the tapered, extended annulus 26 of the dished platen 24 and the discharge end of the stuffing tube 10. While in this condition, a clip can be affixed adjacent the tapered, extended annulus 26 by means of the clip unit 40.

To obtain a taut filled sausage casing, such as is shown in FIG. 6, the flow of food emulsion would first be stopped. Then the dished platen 24 would be advanced away from the end of the stuffing tube 10. In this instance, however, the pre-sizing means 12 are maintained in their expanded, operative position in order to continue to tightly restrain the advance of the unstuffed portion of the casing. Consequently, increased pressure is exerted against the food emulsion at the last filled end of the sausage casing adjacent the dished platen 24. While in this condition, the last filled end of the stuffed sausage casing is closed by actuating the clip unit 40. After a clip 48 is affixed to close the last filled end 54 of the stuffed sausage casing, the pre-sizing means are contracted to prepare for the next stuffing cycle. Hence, by timing the sequential operation of these elements, a variety of end portion configurations can be obtained as will be apparent to those practicing the invention. This is advantageous in the processing of different products and for clip closing a plurality of sausage products from one casing length as described below.

It has also been found that two clip application units can be positioned intermediate the emulsion stoppering ring and the dished platen so that the last filled end of a stuffed sausage casing can be closed with a first clip and a second clip can be applied about one inch from the first clip. The second clip thereby provides a pre-closed end for the next successive length of sausage casing to be stuffed. The portion of sausage casing situate between a last closed end and a pre-closed end can then be severed at any convenient time in the stuffing operation. Hence, by adjusting the sequence of operation of the components of the apparatus and by utilizing longer lengths of sausage casing, a plurality of stuffed sausage casings can be produced without interrupting the operation. It should also be noted that since the pre-sizing means can be expanded to define predetermined diameters, stuffed sausage casings having varying diameters can be produced sequentially.

Although the emulsion stoppering ring, cylindrical stoppering sleeve and dished platen of the invention have been described as being utilized with the apparatus disclosed and described in copending application Ser. No. 599,271 identified above, it should be understood that they can be employed with equal facility with other, commercial stuffing apparatus and other restraining means such as is disclosed and described in copending application Ser. No. 590,566, filed Oct. 31, 1966 and in U.S. Pat. 3,192,559 to Short.

It should be further understood that while the stoppering elements and dished platen of the invention have been described as being utilized cooperatively with each other, they can each be effectively employed separately. However, when the dished platen is to be employed separately, it should be fabricated so that the inside diameter of its extended annulus is no smaller than the inside diameter of the stuffing tube.

What is claimed is:

1. An apparatus for stuffing a sausage casing with a food emulsion comprising, in combination:
   (a) a stuffing tube having an inlet end and a discharge end;
   (b) a casing restraining means mounted on said stuffing tube;
   (c) a cylindrical stoppering sleeve mounted about the discharge end of said stuffing tube;
   (d) an emulsion stoppering ring having an inside diameter larger than the outside diameter of said cylindrical stoppering sleeve movably mounted in concentric relationship with respect to said cylindrical stoppering sleeve; and
   (e) means for advancing and retracting said emulsion stoppering ring into and out of operating position about said cylindrical stoppering sleeve, said emulsion ring forming a closely spaced annular passage of predetermined size when positioned about said sleeve.

2. The apparatus of claim 1 wherein the length of the cylindrical stoppering sleeve is at least about equal to its diameter.

3. The apparatus of claim 1 wherein the emulsion stoppering ring is of a length no less than about ⅓ the length of the cylindrical stoppering sleeve.

4. An apparatus for stuffing a sausage casing with a food emulsion comprising, in combination:
   (a) a stuffing tube having an inlet end and a discharge end; ;
   (b) a casing restraining means mounted on said stuffing tube;
   (c) means adjacent the discharge end of said stuffing tube for elongating, constricting and reducing the diameter of a stuffed sausage casing at its last filled end, said elongating and constricting means comprising a dished platen having an annular passage formed therein, the inside diameter of the annular passage being no smaller than the inside diameter of said stuffing tube; and
   (d) means for closing a stuffed sausage casing in that portion wherein said stuffed sausage casing has been elongated and constricted.

5. The apparatus of claim 4 wherein the means for closing a stuffed sausage casing comprises a clip unit positioned intermediate the elongating and constricting means and the discharge end of the stuffing tube.

6. An apparatus for stuffing a sausage casing with a food emulsion comprising, in combination:
   (a) a stuffing tube having an inlet end and a discharge end;
   (b) a casing restraining means mounted on said stuffing tube;
   (c) means for forming and defining a closely spaced annular passage of predetermined size about the discharge end of said stuffing tube, the closely spaced annular passage being concentric to and about said stuffing tube and having an annular spacing sufficient to permit the wall of a large sausage casing to freely pass therethrough, said passage forming means comprising in combination a cylindrical stoppering sleeve mounted at the discharge end of said stuffing tube, the length of said stoppering sleeve being at least about equal to its diameter; and an emulsion stoppering ring whose inside diameter is greater than the outside diameter of said stoppering sleeve and whose length is no less than about ⅓ the length of the cylindrical stoppering sleeve;
   (d) means adjacent the discharge end of said stuffing tube for elongating, constricting, and reducing the diameter of a stuffed sausage casing at its last filled end; and
   (e) means for closing a stuffed sausage casing in that portion of the stuffed sausage casing wherein it has been elongated and constricted.

7. The apparatus of claim 6 wherein the elongating, compacting and constricting means comprises a dished platen having an annular passage formed therein, which is positioned in alignment with the closely spaced annular passage and whose diameter is no less than the inside diameter of said emulsion stoppering ring.

8. The apparatus of claim 6 wherein the means for closing a stuffed sausage casing comprises at least one clip unit positioned intermediate the discharge end of the stuffing tube and the elongating constricting means.

9. The apparatus of claim 6 wherein the defined, closely spaced annular passage of predetermined size has an annular spacing no less than about 3 times greater than the single wall thickness of a sausage casing to be stuffed and no greater than about ten times the single wall thickness of a sausage casing to be stuffed.

10. A method for stuffing a sausage casing with a food emulsion including the steps of:
    (a) sheathing the open end of a sausage casing having a preclosed end along and about a stuffing tube having an inlet end and a discharge end;
    (b) forming a closely spaced annular passage of predetermined size about the discharge end of said stuffing tube and casing sheathed thereover, said annular passage being large enough to permit the wall of the casing to freely pass therethrough without permitting food emulsion to flow back over said stuffing tube;
    (c) admitting a food emulsion through the stuffing tube to stuff the sausage casing;
    (d) restraining the advance of the sausage casing as it is being stuffed with a food emulsion;
    (e) stopping the stuffing of the sausage casing with food emulsion while a portion of casing remains in the closely spaced annular passage about the discharge end of said stuffing tube to prevent food emulsion from flowing back over the stuffing tube; and
    (f) closing the stuffed sausage casing at its last filled end.

11. The method of claim 10 after step (e) including the step of constricting and compacting the last filled end of the stuffed sausage casing to form an elongated length of stuffed casing having a reduced diameter.

12. The method of claim 11 wherein constricting and compacting the diameter of the last filled end of the stuffed sausage casing is accomplished while the unstuffed portion of the sausage casing is loosely restrained such that there is obtained a stuffed sausage whose last filled end is slack filled.

13. A method for stuffing a sausage casing with a food emulsion including the steps of:
    (a) sheathing the open end of a sausage casing having a preclosed end along and about a stuffing tube having an inlet end and a discharge end;
    (b) admitting a food emulsion through the stuffing tube to stuff the sausage casing;

(c) restraining the advance of the sausage casing as it is being stuffed with a food emulsion;

(d) stopping the stuffing of the sausage casing with food emulsion;

(e) constricting and compacting the diameter of the last filled end of the stuffed sausage casing to form an elongated length of stuffed casing having a reduced diameter; and (f) closing the last filled end of the stuffed sausage casing by affixing a clip in the elongated and constricted portion thereof.

References Cited

UNITED STATES PATENTS

| | | | |
|---|---|---|---|
| 3,396,426 | 8/1968 | Ziolko | 17—35 |
| 3,454,980 | 7/1969 | Washburn | 17—35 |
| 3,457,588 | 7/1969 | Myles et al. | 17—41 |

LUCIE H. LAUDENSLAGER, Primary Examiner

U.S. Cl. X.R.

17—35